(12) United States Patent
Takenaka

(10) Patent No.: US 10,071,600 B2
(45) Date of Patent: Sep. 11, 2018

(54) TIRE FOR MOTORBIKE

(71) Applicant: SUMITOMO RUBBER INDUSTRIES, LTD., Kobe-shi, Hyogo (JP)

(72) Inventor: Kouji Takenaka, Kobe (JP)

(73) Assignee: SUMITOMO RUBBER INDUSTRIES, LTD., Kobe-shi, Hyogo (JP)

( * ) Notice: Subject to any disclaimer, the term of this patent is extended or adjusted under 35 U.S.C. 154(b) by 353 days.

(21) Appl. No.: 14/903,533

(22) PCT Filed: Jul. 1, 2014

(86) PCT No.: PCT/JP2014/067574
§ 371 (c)(1),
(2) Date: Jan. 7, 2016

(87) PCT Pub. No.: WO2015/015988
PCT Pub. Date: Feb. 5, 2015

(65) Prior Publication Data
US 2016/0167441 A1    Jun. 16, 2016

(30) Foreign Application Priority Data

Jul. 29, 2013    (JP) ................................. 2013-157004

(51) Int. Cl.
*B60C 11/03* (2006.01)
(52) U.S. Cl.
CPC ........ *B60C 11/032* (2013.01); *B60C 11/0302* (2013.01); *B60C 11/033* (2013.01);
(Continued)
(58) Field of Classification Search
CPC ............... B60C 11/0302; B60C 11/032; B60C 2200/10; B60C 2200/12
(Continued)

(56) References Cited

U.S. PATENT DOCUMENTS

D640,964 S * 7/2011 Takenaka ..................... D12/535
D644,596 S * 9/2011 Takenaka ..................... D12/535
(Continued)

FOREIGN PATENT DOCUMENTS

EP    2181864 A1    5/2010
JP    2-133206 A    5/1990
(Continued)

OTHER PUBLICATIONS

Extended European Search Report dated Feb. 15, 2017, for European Application No. 14832817.2.

*Primary Examiner* — Robert C Dye
(74) *Attorney, Agent, or Firm* — Birch, Stewart, Kolasch & Birch, LLP

(57) ABSTRACT

A tire for a motorbike can improve turning performance and dry grip performance with good balance. In a tire for a motorbike, a tread part is provided with a first inclined groove and a second inclined groove disposed closer to a tread end than is the first inclined groove. The first inclined groove is provided to a forward-movement grounded area. An inner end of the second inclined groove is provided in an area within a range 2% of a tread expansion radius centered about an end edge of the forward-movement grounded area. An outer end of the second inclined groove is provided to a position displaced from the inner end of the second inclined groove toward the tread end by an interval 20%-30% of the tread expansion radius. Either no other grooves besides the second inclined groove are provided to a second inclined groove formation area, or the length of the area in the direction of expansion width where another groove is located in the second inclined groove formation area is 25% or less of the expansion width of the second inclined groove formation area.

20 Claims, 6 Drawing Sheets

(52) U.S. Cl.
CPC ... *B60C 11/0304* (2013.01); *B60C 2011/0334* (2013.01); *B60C 2011/0374* (2013.01); *B60C 2011/0381* (2013.01); *B60C 2200/10* (2013.01)

(58) Field of Classification Search
USPC .................................................. 152/209.11
See application file for complete search history.

(56) References Cited

U.S. PATENT DOCUMENTS

| | | | |
|---|---|---|---|
| 8,844,589 B2* | 9/2014 | Mariani | B60C 11/0083 152/209.11 |
| 2010/0193095 A1 | 8/2010 | Nakagawa | |
| 2014/0158260 A1* | 6/2014 | Kuwahara | B60C 11/0332 152/209.8 |

FOREIGN PATENT DOCUMENTS

| | | |
|---|---|---|
| JP | 2001-39120 A | 2/2001 |
| JP | 2009-29176 A | 2/2009 |
| JP | 2010-111163 A | 5/2010 |
| JP | 2013-116709 A | 6/2013 |
| WO | WO 2011/080566 A1 | 7/2011 |
| WO | WO 2013/046266 A1 | 4/2013 |

* cited by examiner

TIRE FOR MOTORBIKE

TECHNICAL FIELD

The present invention relates to a motorbike tire having good balance to improve the turning performance and dry grip performance.

BACKGROUND

In general, in order to improve the turning performance of the motorbike tire is required to improve roll agility of transient characteristics during cornering.

The roll agility is a turning performance in a turning early period where a motorbike is slightly tilted from a straight running state and in a turning middle period where the motorbike is more tilted from the turning early period. The roll agility is represented by a length of time from the straight running period to the turning early period or from the turning early period to the turning middle period of the motorbike depending on a rider's steering. As this length of time is shorter, the roll agility is better. In order to improve the roll agility, it is necessary that deformation of the tire is promoted in the turning early period and the turning middle period.

On the other hand, the transient characteristic is a turning performance in the turning middle period or later. The transient characteristic is represented by a length of time of the motorbike until further roll from the turning middle period depending on the rider's steering. As this length of time is longer, the turning stability is higher and the transient characteristic is better. To improve the transient characteristic, it is necessary that the deformation of the tire is suppressed in the turning middle period or later. Following is a technology related to the present invention.

CITATION

Patent Literature

Patent Document 1: Japanese published unexamined application 2001-39120.

SUMMARY OF THE INVENTION

Problems that the Invention is to Solve

The present invention is characterized in that a motorbike tire having a tread portion, wherein the tread portion includes a right region with respect to the tire equator and a left region with respect to the tire equator, each of the right region and the left region is provided with a plurality of first inclined grooves disposed on the tire equator side and spaced in the circumferential direction of the tire, and a plurality of second inclined grooves disposed nearer the tread end side than the first inclined groove and spaced in the circumferential direction of the tire; the first inclined groove comprises a right first inclined groove provided in the right region and a left first inclined groove provided in the left region; the second inclined groove comprises a right second inclined groove provided in the right region and a left second inclined grooves provided in the left region; the first inclined groove is provided in a straight contact region where the tire is assembled in a normal rim and is filled with normal internal pressure, and is loaded normal load and where is to be ground in a plane surface at a camber angle of 0 degree; in the right region and the left region, an axially inner end of the second inclined groove is provided in a region ranging 2% of the tread developed half width with respect to an end edge of the straight contact region, and an axially outer end of the second inclined groove is disposed from 20% to 30% of the tread developed half width nearer the tread end side than the inner end; and no groove other than the second inclined groove is provided in a second inclined groove forming region defined by circumferentially projecting the second inclined groove, or a region length in the developed width direction of the other groove is defined as not more than 25% of the developed width of the second inclined groove forming region.

The motorbike tire in accordance with the present invention comprises the tread portion having a designated rotational direction. Each of the first inclined grooves extends axially outwardly from the axially inner end toward the opposite direction of the rotational direction, and each of the second inclined grooves extends from the axially inner end to the axially outer end in the tire axial direction.

In the motorbike tire according to claim 1 or 2, in the right region and the left region, the axially inner end of the first inclined groove is provided on the tread end side without intersecting with the tire equator.

In the motorbike tire in accordance with the present invention, it is preferable that the first inclined groove has an angle of from 5 to 20 degrees with respect to the tire circumferential direction and the second inclined groove has an angle of from 10 to 30 degrees with respect to the circumferential direction of the tire.

In the motorbike tire in accordance with the present invention, a land ratio of the straight contact region of the tread portion is preferably in a range of from 0.90 to 0.95, and a land ratio of the second inclined groove forming region of the tread portion is preferably in a range of from 0.91 to 0.97.

In the motorbike tire according to any one of claims 1 to 5, the right region and the left region are arranged alternately in the tire circumferential direction.

In the motorbike tire in accordance with the present invention, the right first inclined groove and the left first inclined groove are preferably arranged alternately in the tire circumferential direction.

In the motorbike tire in accordance with the present invention, in each of the right region and the left region, a third inclined groove is spaced in the tire circumferential direction. And an axially inner end of the third inclined groove is preferably positioned axially outer than the axially inner end of the second inclined groove.

In the motorbike tire in accordance with the present invention it is preferable that the third inclined groove has an inclination in the same direction as the second inclined groove and having an angle with respect to the tire circumferential direction larger than the second inclined groove.

In the motorbike tire in accordance with the present invention preferably, in each of the right region and the left region, a fourth inclined grooves are spaced in the tire circumferential direction, an axially inner end of the fourth inclined groove is positioned axially outward of the axially inner end of the third inclined groove.

In the motorbike tire in accordance with the present invention, it is preferable that the fourth inclined groove has the same direction of inclination as the third inclined groove and has an angle with respect to the tire circumferential direction larger than the third inclined groove.

Effect of the Invention

In the motorbike tire of the present invention, the first inclined groove is provided in the straight contact region.

This makes smaller the pattern rigidity of the straight ground area, and the deformation of the tire is promoted where moving from the straight running to the turning. For this reason, the roll agility is improved.

The axially inner end of the second inclined groove is provided in the vicinity of the edge of the straight contact region. Thus, the pattern rigidity in the edge vicinity of the straight contact region decreases and the deformation of the tire is promoted in the turning early period and the turning middle period. For this reason, the roll agility is further improved.

The axially outer end of the second inclined groove is disposed from 20% to 30% of the tread developed half width nearer the tread end side than the axially inner end of the second inclined groove. Thus, the pattern rigidity of the axially outside of the tread portion is maintained high, and the deformation of the tire is suppressed in the turning middle period or later. For this reason, the transient characteristic and the dry grip performance are improved.

No groove other than the second inclined groove is provided in the second inclined groove forming region, or a region length in the developed width direction of the other groove is defined as not more than 25% of the developed width of the second inclined groove forming region. Thus, the rigidity of the second inclined groove forming region is secured, and the deformation of the tire is further suppressed in the turning middle period or later. For this reason, the transient characteristic and the dry grip performance are even more improved.

Therefore, in the motorbike tire of the present invention, the turning performance and the dry grip performance are improved in good balance.

EMBODIMENTS OF THE INVENTION

Hereinafter, one embodiment of the present invention will be described with reference to the drawings.

Figure 1:
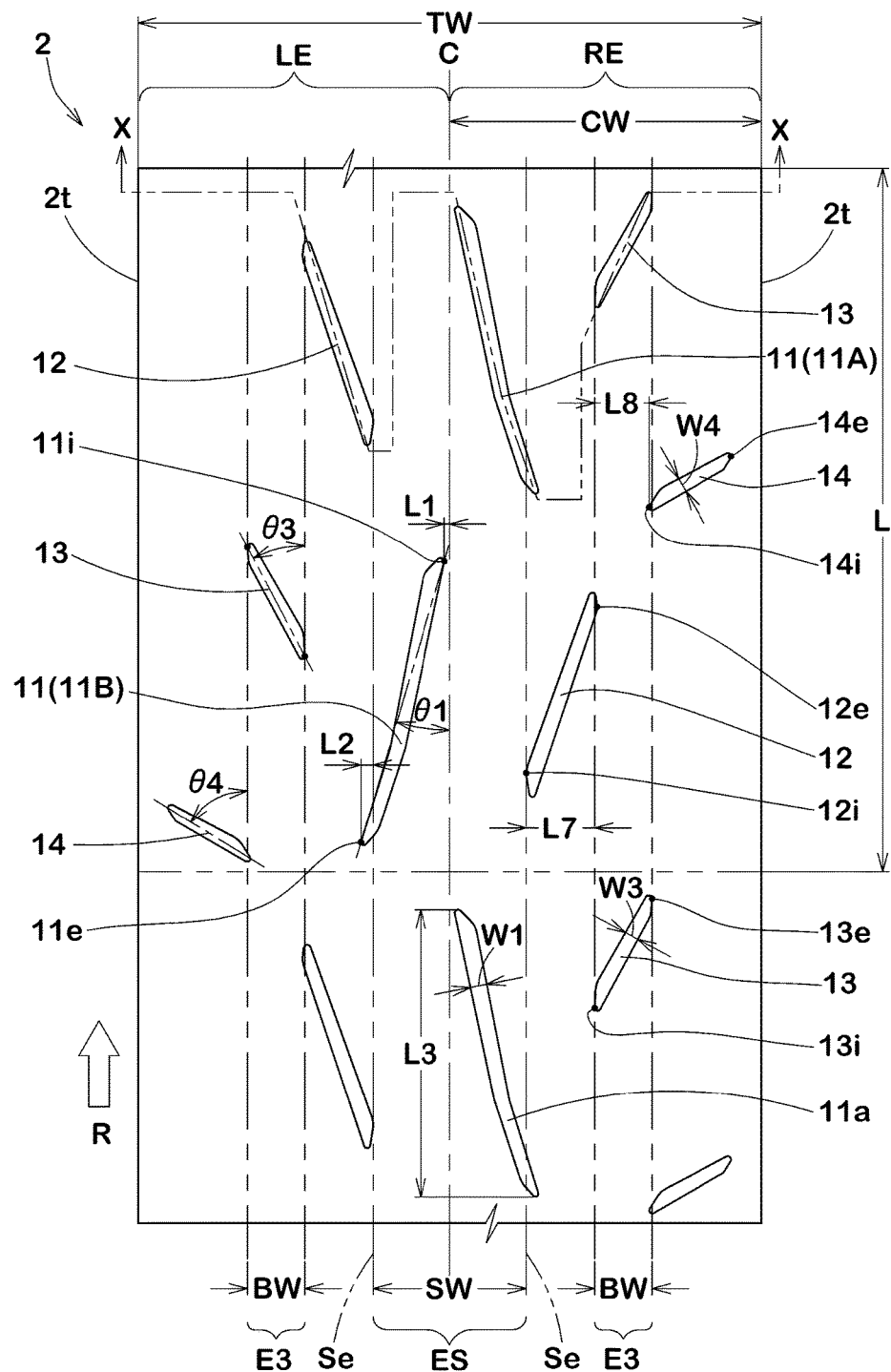
FIG. 1 is a development view of a tread portion of a motorbike tire showing an embodiment of the present invention.
Figure 2:
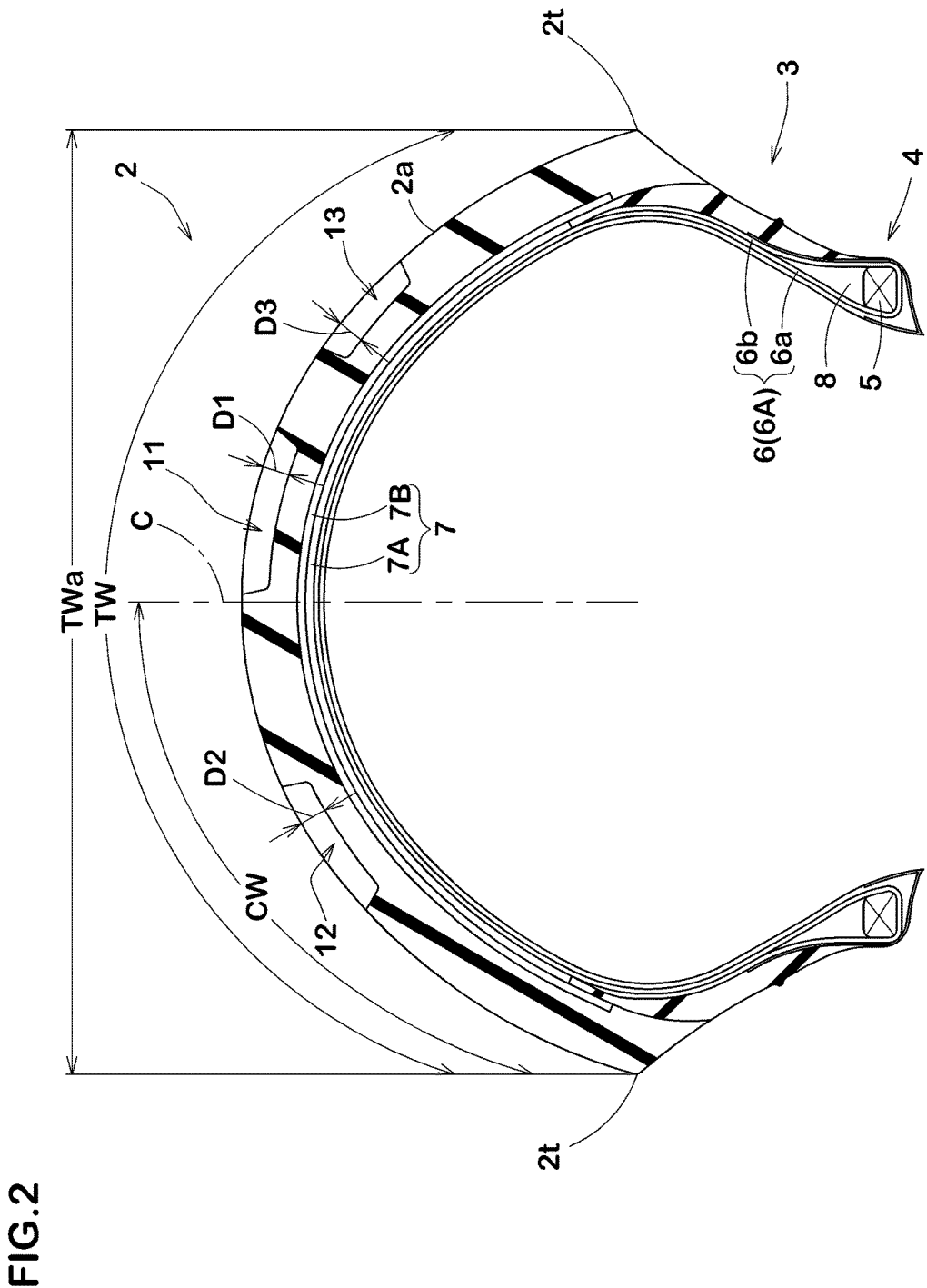
FIG. 2 is a cross-sectional view of the motorbike tire corresponding to the x-x cross-section of FIG. 1.

FIG. 1 is a development view of a tread portion 2 of a motorbike tire (hereinafter, simply referred to as "tire") of the present embodiment. FIG. 2 is an x-x line sectional view of FIG. 1. As used herein, particularly stated otherwise regarding such a ground state, dimensions of each part of the tire are the value specified in the normal state of the tire mounted on a normal rim with the normal inner pressure and unloaded.

The "normal rim" means a rim determined for each tire by a normal including one on which the tire is based, and the normal rim is the normal rim in the case of 3ATMA, a "Design Rim" in the case of TRA, and a "Measuring Rim" in the case of ETRTO.

The "normal internal pressure" means an air pressure determined for each tire by the normal. The "normal internal pressure" is a maximum air pressure in JATMA, a maximum value described in a table "TIRE LOAD LIMITS AT VARIOUS COLD INFLATION PRESSURES" in the case of TRA, and "INFLATION PRESSURE" in the case of ETRTO.

The tire of the present embodiment comprises an asymmetric tread pattern having a designated rotational direction R of the tire. The rotation direction R of the tire is shown in a sidewall portions (shown in FIG. 2), for example, in characters or the like.

As shown in FIG. 2, in the tire, in order to obtain a sufficient ground contact area even at the time of turning when the camber angle is deep, an outer surface 2a between tread ends 2t and 2t of the tread portion 2 extends curved in a circular arc convexed toward the outside. A tread width TW, which is an axial length between the tread ends 2t and 2t, is the greatest width of the tire. A deployment length of the outer surface 2a between the tread ends 2t and 2t is a tread width TW. A developed length of the outer surface 2a between the tread end 2t and the tire equator C is a tread developed half width CW.

The tire comprises a carcass 6 extending from the tread portion 2 through a sidewall portion 3 to a bead core 5 of a bead portion 4, and a tread reinforcing layer 7 disposed radially outer side and inside of the carcass 6 in the tread portion 2.

The carcass 6 is formed of a single carcass ply 6A, for example. The carcass ply 6A includes a main body 6a extending from a tread portion 2 through the sidewall portion 3 to the bead cores 5 embedded in the bead portion 4, and a turned-up portion 6b which is continued to the main body portion 6a and turned up around the bead core 5.

The carcass ply 6A has a carcass cord inclined at an angle of preferably from 75 to 90 degrees, for example, more preferably from 80 to 90 degrees with respect to the tire equator C. For the carcass cord, an organic fiber cord, e.g. nylon, polyester, rayon and the like is preferably used. Incidentally, between the main portion 6a and turned-up portion 6b of the carcass ply 6A, a bead apex 8 made of hard rubber is disposed.

The tread reinforcing layer 7 is formed of at least a single belt cord arranged to be inclined at a small angle of from 5 to 40 degrees with respect to the tire equator C, in the present embodiment two belt plies, that is to say radially inner and outer plies, 7A and 7B of which belt cords are intersected with each other. In addition, for the belt cord, steel cords, aramid or rayon or the like is preferably employed, for example.

As shown in FIG. 1, the tread portion 2 of the tire of the present embodiment includes a right region RE disposed on the right side of the tire equator C, and a left region LE disposed on the of the tire equator C.

The tread portion 2 of the tire comprises a straight contact region ES. The straight contact region ES is a region where the tire under the normal state with the normal load contacts with a plane surface at the camber angle of 0 degrees. A developed width SW between the end edges Se and Se of the straight contact region ES is in a range of from 40% to 60% of the tread developed half width CW, for example. The axial center of the straight contact region is provided on the tire equator C.

In this embodiment, each of the right region RE and the left region LE of the tread portion 2 comprises a first inclined groove 11, a second inclined groove 12, a third inclined groove 13, and a fourth inclined groove 14 which are spaced in the circumferential direction of the tire from the tire equator C toward the tread end 2*t*. Thus, each of the right region RE and the left region LE comprises a second inclined groove forming region E2 (shown in FIG. 3) where the second inclined groove 12 is projected in the tire circumferential direction, and a third inclined groove forming region E3 where the third inclined groove 13 is projected in the circumferential direction.

The first inclined groove 11 is provided in the straight contact region ES. This makes smaller the pattern rigidity of the straight contact region ES, and the deformation of the tire is promoted when shifting from the straight running to the turning. For this reason, the roll agility in the turning early period can be improved.

Each of the first inclined grooves 11 extends from the axially inner end 11*i* toward the opposite direction of the rotation direction R to the axially outer end 11*e*. As a result, the lateral rigidity of the axially outside of the first inclined groove 11 decreases toward the backward direction of the rotation. Therefore, the deformation of the tire when shifting from the straight running to the turning is further promoted. Therefore, the roll agility is further improved.

In order to effectively exhibit the effect described above, the first inclined groove 11 preferably has an angle θ1 of from 5 to 20 degrees with respect to the tire circumferential direction. That is, when the angle θ1 of the first inclined groove 11 is less than 5 degrees, the lateral rigidity of the axial outward of the first inclined groove 11 can not be effectively reduced toward the backward direction of the rotation, and there is a possibility that the roll agility of the turning early period is lowered. Also, when the angle θ1 of the first inclined groove 11 exceeds 20 degrees, there may not be effectively reduced the pattern rigidity of the straight contact region ES. In this specification, the angle θ1 of the first inclined groove 11 is defined by a virtual straight line connecting the axially outer end 11*e* and the axially inner end 11*ii* of the first inclined groove 11 (the same applies to another inclined groove).

The axially inner end 11*ii* of the first inclined groove 11 is provided on the tread end 2*t* side without intersecting the tire equator C in this embodiment. Thus, the pattern rigidity of the tread portion 2 on the tire equator C is secured high, and the dry grip performance during the straight running can be secured high. When a length L1 in the developed width direction between the axially inner end 11*ii* of the first inclined groove 11 and the tire equator C is large, it is not possible to reduce the pattern rigidity of the entire straight contact region ES, and there is a possibility that the roll agility is deteriorated. Therefore, the length L1 in the developed width direction between the axially inner end 11*ii* of the first inclined groove 11 and the tire equator C is preferably from 1.0% to 3.0% of the tread developed half width CW.

The axially outer end 11*e* of the inclined groove 11 of the present embodiment is provided on the axially outer side than the end edge Se of the straight contact region ES. Thus, the pattern rigidity of the vicinity of the end edge of the straight contact region ES further decreases, and the deformation of the tire between the turning early period and the turning middle period is further promoted. When the outer end 11*e* of the first inclined groove 11 is provided axially outer side than the end edge Se of the straight contact region ES, there is a possibility that the deformation of the tire is promoted also in the turning middle period or later. Therefore, the length L2 in the developed width direction between the outer end 11*e* of the first inclined groove 11 and the end edge Se of the straight contact region ES is preferably in a range of from 2% to 10% of the tread developed half width CW.

A land ratio R1 of the straight contact region ES is preferably in a range of from 0.90 to 0.95. As a result, the dry grip performance in the straight running period and the roll agility in the turning early period are improved in good balance. When the land ratio R1 of the straight contact region ES is less than 0.90, the pattern rigidity of the straight contact region ES decreases, and the dry grip performance, especially the dry grip performance in the straight running period, is likely to be worse. When the land ratio R1 of the straight contact region ES is more than 0.95, the pattern rigidity of the straight contact region ES increases, and the roll agility in the turning early period is likely to be worse. The land ratio R1 of the straight contact region ES is a ratio (Ma/Mb) between a total surface area Ma of a tread of the straight contact region ES and a virtual surface area Mb of a tread of the straight contact region ES obtained by filling the first inclined groove 11 or the second inclined groove 12.

A right first inclined groove 11A provided in the right region RE and a left first inclined groove 11B provided in the left region LE are arranged alternately in the tire circumferential direction in this embodiment. As a result, the pattern rigidity of the straight contact region ES is ensured in good balanced on both sides of the tire equator C, further the turning performance is improved.

The first inclined groove 11 of this embodiment includes a tapering section 11*a* of which a groove width W1 is gradually reduced toward the one side in the tire circumferential direction (a bottom side in FIG. 1) in not less than 70% of the circumferential length L3 of the first inclined groove 11. The first inclined groove 11 is possible to suppress the excessive decrease of the pattern rigidity of the straight contact region ES and to ensure the dry grip performance.

In order to improve the roll agility and the dry grip performance in good balance, the groove width W1 of the first inclined groove 11 (a developed width along the longitudinal direction) is preferably in a range of about from 2.0 to 7.0 mm. The groove depth D1 of the first inclined groove 11 (shown in FIG. 2) is preferably in a range of about from 2.0 to 6.0 mm.

The axially inner end 12*i* of the second inclined groove 12 is provided in the region ranging 2% of the tread developed half width CW with respect to the end edge Se of the straight contact region ES. Thus, a pattern rigidity of a vicinity of the end edge Se of the straight contact region ES decreases, and the deformation of the tire is further accelerated in the turning early period and the turning middle period. For this reason, the roll agility is further improved. When the axially inner end 12*i* of the second inclined groove 12 is provided in the axial inside of the end edge Se of the straight contact region ES beyond 2% of the tread developed half width CW, the dry grip performance in the straight running period is greatly reduced. When the axially inner end 12*i* of the second inclined groove 12 is provided in the axial outside of the end edge Se of the straight contact region ES beyond 2% of the tread developed half width CW, it is not possible to reduce the pattern rigidity of the vicinity of the end edge Se of the straight contact region ES. Therefore, the deformation of the tire is suppressed between the turning early period and the turning middle period.

The axially outer end 12*e* of the second inclined groove 12 is disposed from 20% to 30% of the tread developed half width CW nearer the tread end 2*t* side than the axially inner end 12*i* of the second inclined groove 12. Thus, the pattern rigidity of the axial outside of the tread portion 2 is kept high, and the deformation of the tire is suppressed in the turning middle period or later. For this reason, the transient characteristic and the dry grip performance are improved.

When the outer end 12e of the second inclined groove is provided at a position less than 20% of the tread developed half width CW spaced from the axially inner end 12i, it is not possible to reduce the pattern rigidity of the tread portion 2 which grounds in the turning middle period. For this reason, the roll agility in the turning middle period deteriorates. When the outer end 12e of the second inclined groove is provided at a position more than 30% of the tread developed half width CW spaced from the axially inner end 12i, the pattern rigidity of the axially outside of the tread portion 2 is lowered, and the deformation of the tire is promoted also between the turning middle period and the turning terminal period. For this reason, the transient characteristic and the dry grip performance are deteriorated.

Figure 3:
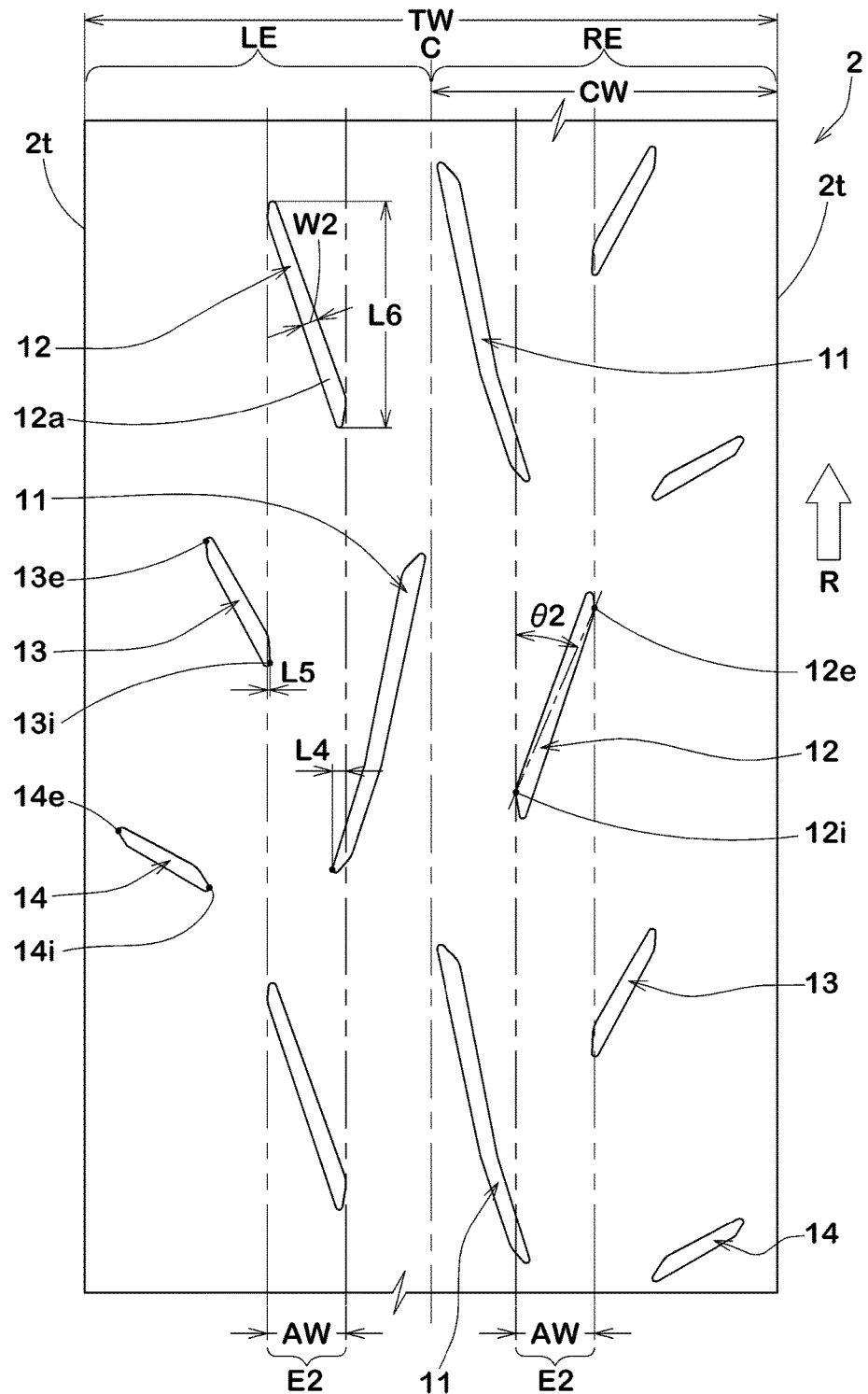
FIG. 3 is a development view of the tread portion of the motorbike tire showing an embodiment of the present invention.

As shown in FIG. 3, the second inclined groove forming region E2 comprises grooves other than the second inclined groove 12. In the second inclined groove forming region E2 in this embodiment, the first inclined groove 11 and the third inclined groove 13 are disposed. Region lengths (L4+L5) in the developed width direction of the grooves 11 and 13 other than the second inclined groove 12 is not more than 25% of the developed width AW of the second inclined groove forming region E2. Thus, the rigidity of the second inclined groove forming region E2 is secured, and the deformation of the tire is further suppressed in the turning middle period or later.

From the viewpoints of reducing the rigidity of the axial inside of the second inclined groove forming region E2 and of smoothing the deformation of the tire between the turning early period and the turning middle period, it is preferable that the region length L4 in the developed width direction of the first inclined groove 11 disposed in the second inclined groove forming are E2 is not more than 15% of the developed width AW of the second inclined groove forming region E2. The region length L5 in the developed width direction of the third inclined groove 13 disposed in the axially outside of the second inclined groove forming region E2 is preferably not more than 5% of the developed width AW of the second inclined groove forming region E2 in order to reliably suppress the deformation of the tire.

In view of even improving in the transient characteristic and the dry grip performance, the second inclined groove forming region E2 may have an aspect of not comprising other than the second inclined groove 12.

A land ratio R2 of the second inclined groove forming region E2 is preferably in a range of from 0.91 to 0.97. That is, when the land ratio R2 of the second inclined groove forming region E2 is less than 0.91, the dry grip performance may be lowered in the turning middle period. When the land ratio R2 of the second inclined groove forming region E2 is greater than 0.97, there is a possibility that the deformation of the tire is not promoted between the turning early period and the turning middle period. The land ratio R2 is a ratio (Mc/Md) between a total surface area Mc of the tread of the second inclined groove forming region E2 and a virtual surface area Md of a virtual tread surface of the second inclined groove forming region obtained by filling through the first inclined groove 11 to third inclined groove 13.

The land ratio R2 of the second inclined groove forming region E2 is preferably greater than the land ratio R1 of the straight contact region ES. As a result, since the pattern rigidity of the second inclined groove forming region E2 is ensured larger than the pattern rigidity of the straight contact region ES, the deformation of the tire in the turning middle period or later is reliably prevented. Therefore, the roll agility in the turning early period and the transient characteristic in the turning middle period are improved in good balance.

The second inclined groove 12 of the present embodiment extends from the axially inner end 12i to the axially outer end 12e in the direction of rotation R. Thus, the lateral rigidity of axially outer side of the second inclined groove 12 can be secured largely in the backward direction of the rotation. Therefore, since the deformation of the tire is suppressed in the turning middle period or later, the transient characteristic are even more improved.

In order to effectively exhibit the effects described above, the second inclined groove 12 is preferable to have an angle θ2 of from 10 to 30 degrees with respect to the tire circumferential direction. That is, when the angle θ2 of the second inclined groove 12 exceeds 30 degrees, the tire circumferential length L6 of the second inclined groove 12 is excessively small. For this reason, the pattern rigidity of the second inclined groove forming region E2 is excessively large, and the roll agility in the turning middle period is likely to be worse. When the angle θ2 of the second inclined groove 12 is less than 10 degrees, the tire circumferential length L6 of the second inclined groove 12 is excessively large, and the pattern rigidity of the second inclined groove forming region E2 decreases, and the transient characteristic in the turning middle period or later may decrease.

The angle θ2 of the second inclined groove 12 is preferably larger than an angle θ1 (shown in FIG. 1) of the first inclined groove 11. Thus, in the time of turning, the lateral rigidity of the second inclined groove forming region E2, on which an axial road larger than the straight contact region ES acts, is improved. For this reason, the turning performance is further improved. From this standpoint, the angle θ2 of the second inclined groove 12 is preferably from 5 to 15 degrees larger than the angle θ1 of the first inclined groove 11.

In each of the right region RE and the left region LE, the first inclined groove 11 and the second inclined groove 12 are preferably provided alternately in the tire circumferential direction. As a result, in each of the right region RE and the left region LE, the pattern rigidity can be secured in good balance. For this reason, the turning performance and the dry grip performance can improved in better balance.

The second inclined groove 12 of the present embodiment includes a tapering section 12a where a groove width W2 gradually reduces toward the axial outside in more than 70% of the second tire circumferential length L6 of the inclined grooves 12. Such a second inclined groove 12 increases the pattern rigidity of the tire axial outside of the second inclined groove forming region E2 and improves the dry grip performance and the transient characteristic.

In order to improve the roll agility and the dry grip performance in good balance, the groove width W2 of the second inclined groove 12 is preferably about from 1.5 to 6.5 mm. A groove depth D2 (shown in FIG. 2) of the second inclined groove 12 is preferably about from 70% to 90% of the groove depth D1 of the first inclined groove 11.

As shown in FIG. 1, an axially inner end 13i of the third inclined groove 13 is provided on the axially outer side than the axially inner end 12i of the second inclined groove 12. Thus, the rigidity of the second inclined groove forming region E2 is secured, and the deformation of the tire is suppressed in the turning middle period or later. When a length L7 in the developed width direction, which is a length between the inner end 13i of the third inclined groove 13 and the inner end 12i of the second inclined grooves 12, is excessively large, a rigidity difference near the axially outer end 12e of the second inclined groove 12 increases, the tire may not possibly turn smoothly. Therefore, the length L7 in the developed width direction is preferably in a range of from 85% to 100% of the developed width AW (shown in FIG. 3) of the second inclined groove forming region E2.

The third inclined groove 13 is inclined in the same direction as the second inclined groove 12. That is, the third inclined groove 13 extends from the axially inner end 13i of the third inclined groove 13 to the axially outer end 13e in the rotation direction R. Thus, the lateral rigidity of the land portion in the axially outer side than the third inclined groove 13 increases even larger toward the backward direction of the rotation. Therefore, the deformation of the tire is suppressed in from the turning middle period to the turning later period.

The third inclined groove 13 preferably has an angle θ3 with respect to the tire circumferential direction larger than the second inclined groove 12. As a result, the lateral rigidity of a third inclined groove forming region E3, on which a lateral force larger than the second inclined groove forming region E2 acts, is largely secured. Therefore, the turning performance is further improved. When the angle θ3 of the third inclined groove 13 is excessively larger than the angle θ2 of the second inclined groove 12, the rigidity difference between the second inclined groove forming region E2 and the third inclined groove forming region E3 increases, and the tire may not possibly turn smoothly. From this standpoint, the angle θ3 of the third inclined groove 13 is preferably from 2 to 15 degrees greater than the angle θ2 of the second inclined groove 12. From the same point of view, the angle θ3 of the third inclined groove 13 is preferably in a range of from 20 to 40 degrees.

Although not particularly limited, a developed width BW of the third inclined groove forming region E3 is preferably in a range of from 15% to 25% of the tread developed half width CW.

An axially inner end 14i of the fourth inclined groove 14 is provided on the axially outer side than the axially inner end 13i of the third inclined groove 13. Thus, the pattern rigidity of the third inclined groove forming region E3 is secured high. A length L8 in the developed width direction between the inner end 14i of the fourth inclined groove 14 and the inner end 13i of the third inclined groove 13 is preferably in a range of from 85% to 100% of the developed width BW of the third inclined groove forming region E3.

The fourth inclined groove 14 has an inclination in the same direction as the third inclined groove 13. That is, the fourth inclined groove 14 extends from the axially inner end 14i of the fourth inclined groove 14 to the axially outer end 14e in the rotation direction R. Thus, the lateral rigidity in the axially outer side of the fourth inclined groove 14 is ensured even greater toward the backward direction of the rotation. Thus, since the deformation of the tire is suppressed in the turning terminal period, the transient characteristic is further improved.

The fourth inclined groove 14 has an angle θ4 with respect to the tire circumferential direction larger than the angle θ3 of the third inclined groove 13. As a result, the lateral rigidity of the land portion outward the third inclined groove forming region E3, on which a large lateral force than the third inclined groove forming region E3 acts, is largely secured. When the angle θ4 of the fourth inclined groove 14 is excessively larger than the angle θ3 of the third inclined groove 13, the rigidity difference between the third inclined groove forming region E3 and the land portion outward the third inclined groove forming region E3 may increase. For this reason, the angle θ4 of the fourth inclined groove 14 is preferably from 20 to 40 degrees larger than the angle θ3 of the third inclined groove 13. From the same point of view, the angle θ4 of the fourth inclined groove 14 is preferably in a range of from 50 to 70 degrees.

The outer end 14e of the fourth inclined groove 14 terminates in the tread portion 2 without reaching the tread end 2t. As a result, the transient characteristic in the time of maximum turning is further improved.

To improve the roll agility and the dry grip performance in good balance, the third groove width W3 of the third inclined grooves 13 and the groove width W4 of the fourth inclined groove 14 are preferably in a range of from 1.0 to 6.0 mm. A groove depth D3 (shown in FIG. 2) of the third inclined groove 13 and a groove depth (not shown) of the fourth inclined groove 14 are preferably in a range of from 70% to 90% of the groove depth D1 of the first inclined groove 11.

Above, although embodiments of the invention have been described in detail, the invention is not intended to be limited to the specific embodiments described above are implemented by changing the various aspects.

Example

In order to confirm the effects of the present invention, motorbike tires having a basic pattern of FIG. 1 were tested based on the specifications shown in Table 1. The main common specifications and testing methods of each tire were as follows.

Tread width TWa: 122 mm

Tread developed half width CW: 83 mm

Developed width SW of straight contact region: 41 mm

Groove depth D1 of first inclined groove: 4.1 mm

Groove depth D2 of second inclined groove: 3.7 mm

Groove depth D3 of third inclined groove: 3.5 mm

Angle θ3 of third inclined groove: 35 degrees

Groove depth D4 of fourth inclined groove: 3.3 mm

Angle θ4 of fourth inclined groove: 60 degrees

Pitch L (shown in FIG. 1) of first inclined groove: 188 mm

<Turning Performance and Dry Grip Performance>

Each of the test tires were attached to the all-wheels of a motorbike of 1000 cc displacement under the following conditions. Then, a test rider ran the motorbike on a test course of dry asphalt road surface and evaluated turning performance by roll agility and transient characteristic and driving characteristics regarding dry grip in a sensory test. The results are displayed in five-point method with the conventional example as 4.0. The numerical value is larger, the better the turning performance and dry grip performance.

(Front Tire)

Size: 120/70ZR17

Rim: MT3.50×17

Internal pressure: 250 kPa (Rear Tire)

Size: 190/55ZR17

Rim: MT6.00×17

Internal pressure: 290 kPa

The test results and the like are shown in Table 1.

TABLE 1

Figure 6:
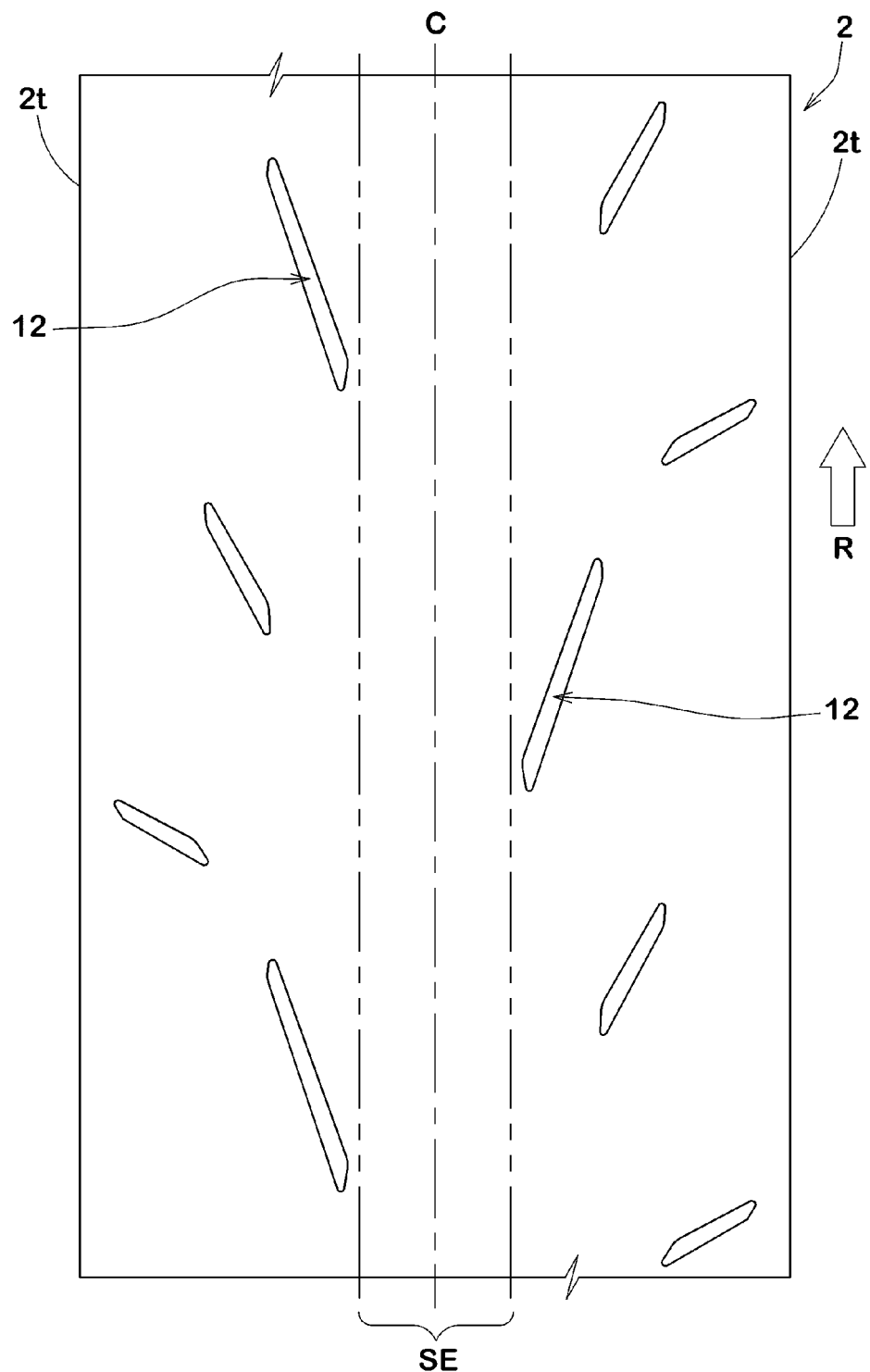
FIG. 6 is a development view of the tread portion showing an embodiment of a comparative example.

|  | Con. Ex. | Compar. Ex. 1 | Ex. 1 | Compar. Ex. 2 | Ex. 2 | Ex. 3 | Compar. Ex. 3 | Compar. Ex. 4 | Ex. 4 | Ex. 5 | Compar. Ex. 5 | Ex. 6 |
|---|---|---|---|---|---|---|---|---|---|---|---|---|
| Figure showing shape of tread portion | FIG. 1 | FIG. 6 | FIG. 1 | FIG. 1 | FIG. 1 | FIG. 1 | FIG. 1 | FIG. 1 | FIG. 1 | FIG. 1 | FIG. 1 | FIG. 1 |
| Length in developed width direction between end edge and inner end of second inclined groove/CW [%] *1 | 10 | 0 | 0 | −3 | −2 | 2 | 3 | 0 | 0 | 0 | 0 | 0 |
| Length in developed width direction between outer end and inner end of second inclined groove/CW [%] *1 | 22 | 25 | 25 | 25 | 25 | 25 | 25 | 18 | 20 | 30 | 35 | 25 |
| Region length of another groove/developed width of second inclined groove forming region [%] *2 | 100 | 5 | 25 | 25 | 25 | 25 | 25 | 25 | 25 | 25 | 25 | 20 |
| Angle θ1 of first inclined groove angle [degrees] | 10 | — | 10 | 10 | 10 | 10 | 10 | 10 | 10 | 10 | 10 | 10 |
| Angle θ2 of second inclined groove [degrees] | 20 | 20 | 20 | 20 | 20 | 20 | 20 | 20 | 20 | 20 | 20 | 20 |
| Land ratio R1 of straight contact region [%] | 91 | 100 | 92 | 90 | 91 | 92 | 92 | 92 | 92 | 92 | 92 | 92 |
| Land ratio R2 of second inclined groove forming region [%] | 95 | 95 | 95 | 95 | 95 | 95 | 95 | 95 | 95 | 95 | 95 | 95 |
| Roll agility in turning early period [5-point method; Larger is better.] | 4.0 | 3.5 | 5.0 | 3.5 | 4.0 | 4.0 | 3.5 | 4.0 | 4.0 | 4.5 | 5.0 | 5.0 |
| Roll agility in turning middle period [5-point method; Larger is better.] | 4.0 | 4.5 | 5.0 | 4.5 | 4.5 | 4.5 | 4.0 | 3.5 | 4.0 | 4.0 | 3.5 | 4.5 |
| Transient characteristic [5-point method; Larger is better.] | 4.0 | 3.0 | 5.0 | 3.5 | 4.0 | 4.0 | 3.5 | 4.0 | 4.0 | 4.0 | 3.5 | 5.0 |
| Dry grip performance [5-point method; Larger is better.] | 4.0 | 5.0 | 5.0 | 4.5 | 4.5 | 4.5 | 5.0 | 5.0 | 5.0 | 5.0 | 4.5 | 5.0 |

Figure 4:
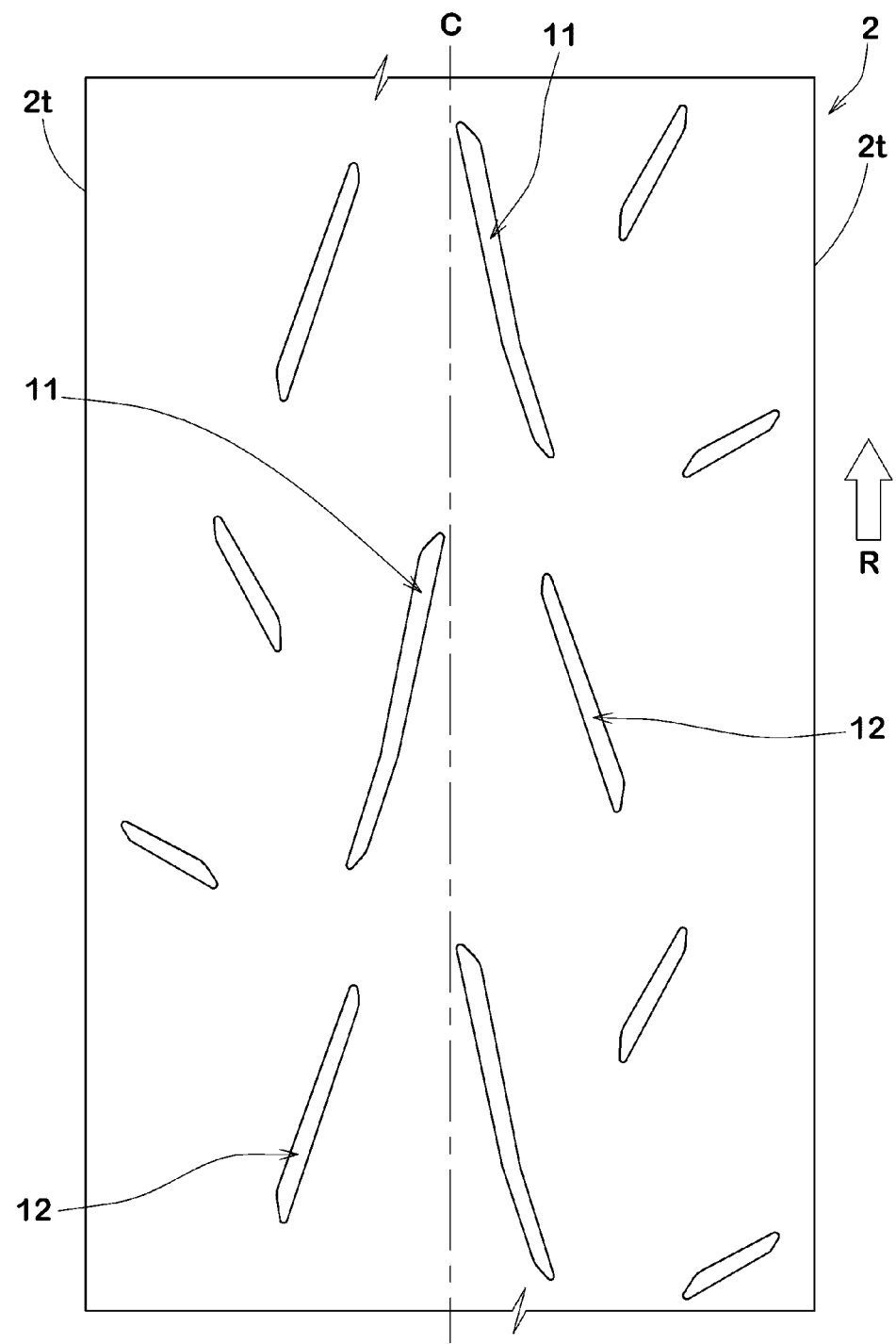
FIG. 4 is a development view of the tread portion showing another embodiment of the present invention.
Figure 5:
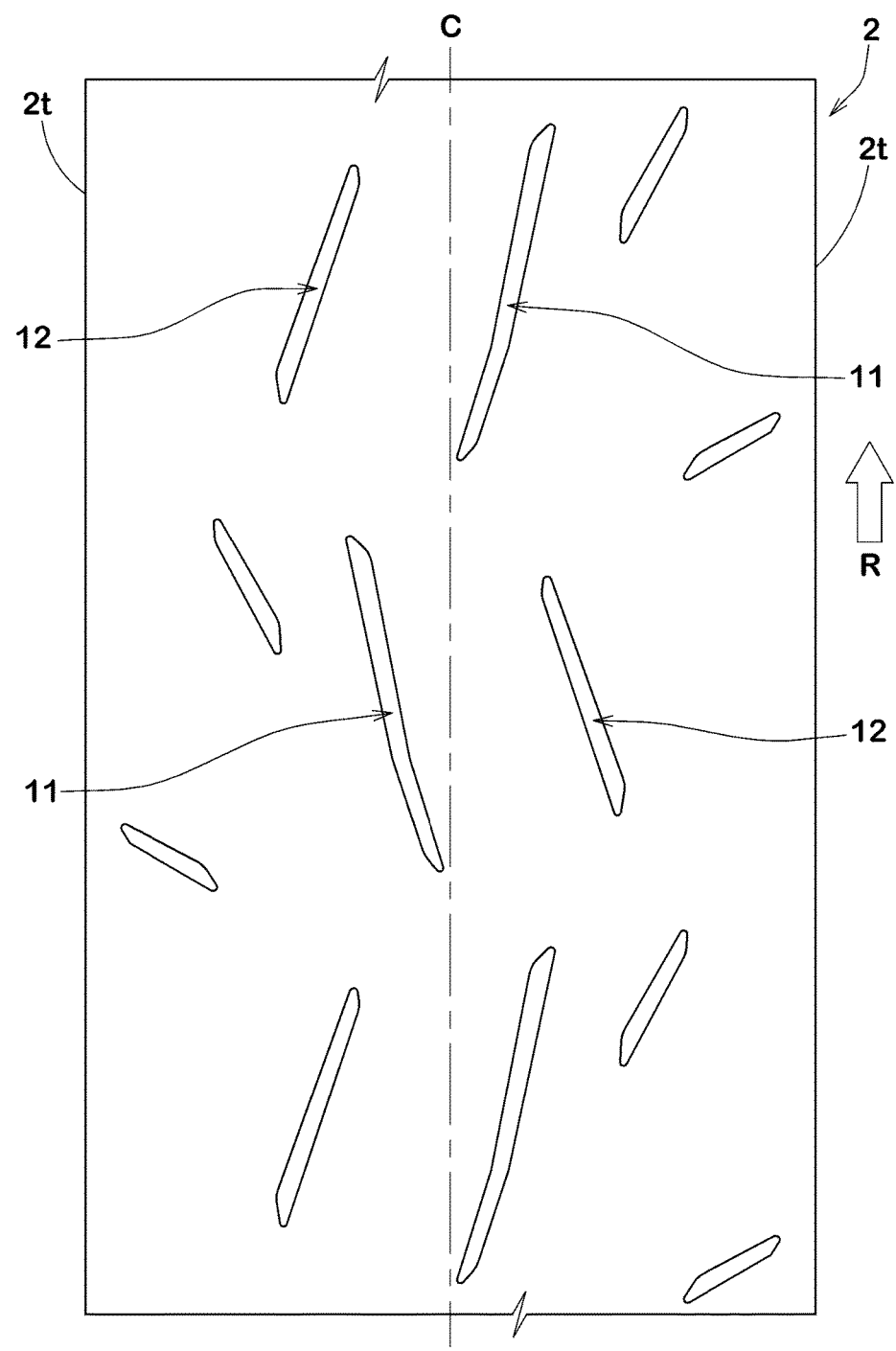
FIG. 5 is a development view of the tread portion of yet another embodiment of the present invention.

|  | Compar. Ex. 6 | Ex. 7 | Ex. 8 | Ex. 9 | Ex. 10 | Ex. 11 | Ex. 12 | Ex. 13 | Ex. 14 | Ex. 15 | Ex. 16 |
|---|---|---|---|---|---|---|---|---|---|---|---|
| Figure showing shape of tread portion | FIG. 1 | FIG. 1 | FIG. 1 | FIG. 1 | FIG. 1 | FIG. 1 | FIG. 1 | FIG. 1 | FIG. 1 | FIG. 4 | FIG. 5 |
| Length in developed width direction between end edge and inner end of second inclined groove/CW [%] *1 | 0 | 0 | 0 | 0 | 0 | 0 | 0 | 0 | 0 | 0 | 0 |
| Length in developed width direction between outer end and inner end of second inclined groove e/CW [%] *1 | 25 | 25 | 25 | 25 | 25 | 25 | 25 | 25 | 25 | 25 | 25 |
| Region length of another groove/developed width of second inclined groove forming region [%] *2 | 30 | 25 | 25 | 25 | 25 | 25 | 25 | 25 | 25 | 25 | 25 |
| Angle θ1 of first inclined groove angle [degrees] | 10 | 3 | 5 | 20 | 22 | 10 | 10 | 10 | 10 | 10 | 10 |
| Angle θ2 of second inclined groove [degrees] | 20 | 20 | 20 | 20 | 20 | 8 | 10 | 30 | 35 | 20 | 20 |
| Land ratio R1 of straight contact region [%] | 92 | 92 | 92 | 92 | 92 | 92 | 92 | 92 | 92 | 92 | 92 |
| Land ratio R2 of second inclined groove forming region [%] | 95 | 95 | 95 | 95 | 95 | 96 | 96 | 94 | 94 | 95 | 95 |
| Roll agility in turning early period [5-point method; Larger is better.] | 4.0 | 4.0 | 4.5 | 5.0 | 5.0 | 5.0 | 5.0 | 5.0 | 5.0 | 5.0 | 5.0 |
| Roll agility in turning middle period [5-point method; Larger is better.] | 4.0 | 5.0 | 5.0 | 5.0 | 5.0 | 4.0 | 4.5 | 5.0 | 5.0 | 4.0 | 4.0 |
| Transient characteristic [5-point method; Larger is better.] | 4.0 | 5.0 | 5.0 | 4.5 | 4.0 | 5.0 | 5.0 | 4.5 | 4.0 | 3.5 | 4.0 |
| Dry grip performance [5-point method; Larger is better.] | 4.5 | 5.0 | 5.0 | 5.0 | 5.0 | 5.0 | 5.0 | 5.0 | 5.0 | 5.0 | 5.0 |

*1 End edge: End edge of straight contact region
*1 CW: Tread developed half width
*1 Negative notation indicates that the inner end is inside the tire axial direction than the edge.
*2 Another groove: All the grooves other than the second inclined groove provided in the second inclined groove forming region.
*2 Region length: A region length in the developed width direction in the second inclined groove forming region.

The test results, it could be confirmed that the performances were improved in good balance in the tires of Examples as compared with the tires of comparative Examples and conventional Examples. Moreover, it has been made the same test by changing the tire sizes, the same tendency as the test result was indicated.

DESCRIPTION OF THE CODE

2 Tread portion
11 First inclined groove
12 Second inclined groove
ES Straight contact region
Se End edge of straight contact region
CW Tread developed half width
2t Tread end

The invention claimed is:

1. A motorbike tire having a tread portion, wherein
the tread portion includes a right region with respect to the tire equator and a left region with respect to the tire equator,
each of the right region and the left region is provided with
a plurality of first inclined grooves disposed on the tire equator side and spaced in the circumferential direction of the tire, and
a plurality of second inclined grooves disposed nearer the tread end side than the first inclined grooves and spaced in the circumferential direction of the tire;
the first inclined grooves comprise right first inclined grooves provided in the right region and left first inclined grooves provided in the left region;
the second inclined grooves comprise right second inclined grooves provided in the right region and left second inclined grooves provided in the left region;
the first inclined grooves are provided in a straight contact region where the tire is assembled in a normal rim and is filled with normal internal pressure, and is loaded normal load and where is to be ground in a plane surface at a camber angle of 0 degree;
in the right region and the left region,
an axially inner end of each of the second inclined grooves is provided in a region ranging 2% of the tread developed half width with respect to an end edge of the straight contact region, and
an axially outer end of each of the second inclined grooves is disposed from 20% to 30% of the tread developed half width nearer the tread end side than the corresponding inner end; and
in each of second inclined groove forming regions defined by circumferentially projecting the second inclined grooves, no grooves other than the second inclined grooves are provided, or a total of a region length in a developed width direction of one of the first inclined grooves and the region length of one of third inclined grooves is defined as not more than 25% of the developed width of the respective second inclined groove forming region.

2. The motorbike tire according to claim 1, wherein
the tread portion having a designated rotational direction;
each of the first inclined grooves extends axially outwardly from the axially inner end toward the opposite direction of the rotational direction; and
each of the second inclined grooves extends from the axially inner end to the axially outer end in the rotational direction.

3. The motorbike tire according to claim 2, wherein
each of the first inclined grooves has an angle of from 5 to 20 degrees with respect to the tire circumferential direction, and
each of the second inclined grooves has an angle of from 10 to 30 degrees with respect to the tire circumferential direction.

4. The motorbike tire according to claim 3, wherein
a land ratio of the straight contact region of the tread portion is in a range of from 0.90 to 0.95, and a land ratio of the second inclined groove forming region of the tread portion is in a range of from 0.91 to 0.97.

5. The motorbike tire according to claim 3, wherein in each of the right region and the left region, the first inclined grooves and the second inclined grooves are arranged alternately in the tire circumferential direction.

6. The motorbike tire according to claim 2, wherein
in each of the right region and the left region, the axially inner end of the first inclined grooves are provided on the tread end side without intersecting with the tire equator.

7. The motorbike tire according to claim 2, wherein
a land ratio of the straight contact region of the tread portion is in a range of from 0.90 to 0.95, and a land ratio of the second inclined groove forming region of the tread portion is in a range of from 0.91 to 0.97.

8. The motorbike tire according to claim 2, wherein in each of the right region and the left region, the first inclined grooves and the second inclined grooves are arranged alternately in the tire circumferential direction.

9. The motorbike tire according to claim 2, wherein a right first inclined groove and a left first inclined groove are arranged alternately in the tire circumferential direction.

10. The motorbike tire according to claim 1, wherein
in each of the right region and the left region, the axially inner ends of the first inclined grooves are provided on the tread end side without intersecting with the tire equator.

11. The motorbike tire according to claim 3, wherein
a land ratio of the straight contact region of the tread portion is in a range of from 0.90 to 0.95, and a land ratio of the second inclined groove forming region of the tread portion is in a range of from 0.91 to 0.97.

12. The motorbike tire according to claim 10, wherein in each of the right region and the left region, the first inclined grooves and the second inclined grooves are arranged alternately in the tire circumferential direction.

13. The motorbike tire according to claim 1, wherein
a land ratio of the straight contact region of the tread portion is in a range of from 0.90 to 0.95, and a land ratio of the second inclined groove forming region of the tread portion is in a range of from 0.91 to 0.97.

14. The motorbike tire according to claim 13, wherein in each of the right region and the left region, the first inclined grooves and the second inclined grooves are arranged alternately in the tire circumferential direction.

15. The motorbike tire according to claim 1, wherein in each of the right region and the left region, the first inclined groove and the second inclined grooves are arranged alternately in the tire circumferential direction.

16. The motorbike tire according to claim 1, wherein a right first inclined groove and a left first inclined groove are arranged alternately in the tire circumferential direction.

17. The motorbike tire according to claim 1, wherein
in each of the right region and the left region, the third inclined grooves are spaced in the tire circumferential direction; and the axially inner ends the third inclined grooves are positioned axially outer than of the axially inner ends of the second inclined grooves.

18. The motorbike tire according to claim 17, wherein each of the third inclined grooves has an inclination in the same direction as the second inclined grooves and has an angle with respect to the tire circumferential direction larger than each of the second inclined grooves.

19. The motorbike tire according to claim 17, wherein in each of the right region and the left region, fourth inclined grooves are spaced in the tire circumferential direction, the axially inner ends of the fourth inclined grooves are positioned axially outward of the axially inner ends of the third inclined grooves.

20. The motorbike tire according to claim 19, wherein each of the fourth inclined grooves has the same direction of inclination as the third inclined grooves, and has an angle with respect to the tire circumferential direction larger than each of the third inclined grooves.

\* \* \* \* \*